(12) United States Patent
Heer et al.

(10) Patent No.: US 7,627,599 B2
(45) Date of Patent: Dec. 1, 2009

(54) METHOD, APPARATUS, AND PROGRAM PRODUCT FOR VISUALIZING TREE STRUCTURED INFORMATION

(75) Inventors: Jeffery M Heer, San Francisco, CA (US); Stuart K Card, Los Altos Hills, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 289 days.

(21) Appl. No.: 11/401,026

(22) Filed: Apr. 10, 2006

(65) Prior Publication Data

US 2006/0288311 A1   Dec. 21, 2006

Related U.S. Application Data

(60) Provisional application No. 60/682,888, filed on May 20, 2005.

(51) Int. Cl.
*G06F 17/00* (2006.01)
(52) U.S. Cl. .................. 707/102; 715/243; 715/853
(58) Field of Classification Search .................. None
See application file for complete search history.

(56) References Cited

U.S. PATENT DOCUMENTS

| | | | |
|---|---|---|---|
| 3,944,736 A | 3/1976 | Shepard | 348/722 |
| 4,317,961 A | 3/1982 | Johnson | 379/204.01 |
| 4,531,024 A | 7/1985 | Colton et al. | 379/93.14 |
| 4,734,934 A | 3/1988 | Boggs et al. | 379/202.01 |
| 5,473,605 A | 12/1995 | Grube et al. | 370/261 |
| 5,483,588 A | 1/1996 | Eaton et al. | 379/202.01 |
| 5,495,522 A | 2/1996 | Allen et al. | 379/202.01 |
| 5,548,638 A | 8/1996 | Yamaguchi et al. | 379/202.01 |
| 5,557,725 A | 9/1996 | Ansberry et al. | 715/755 |
| 5,561,737 A | 10/1996 | Bowen | 704/275 |
| 5,566,238 A | 10/1996 | Wagner et al. | 704/275 |
| 5,668,863 A | 9/1997 | Bieselin et al. | 379/202.01 |
| 5,761,637 A | 6/1998 | Chino | 704/231 |
| 5,768,263 A | 6/1998 | Tischler et al. | 370/263 |
| 5,771,273 A | 6/1998 | McAllister et al. | 379/88.01 |
| 5,818,514 A | 10/1998 | Duttweiler et al. | 379/88.01 |
| 5,889,764 A | 3/1999 | Needham et al. | 370/263 |
| 5,889,843 A | 3/1999 | Singer et al. | 379/202.01 |
| 5,953,400 A | 9/1999 | Rosenthal et al. | 379/202.01 |
| 5,991,277 A | 11/1999 | Maeng et al. | 370/263 |
| 5,991,385 A | 11/1999 | Dunn et al. | 379/202.01 |
| 6,157,711 A | 12/2000 | Katz | 379/265.01 |
| 6,178,237 B1 | 1/2001 | Horn | 379/202.01 |
| 6,236,854 B1 | 5/2001 | Bradshaw, Jr. | 455/416 |
| 6,304,648 B1 | 10/2001 | Chang | 379/202.01 |

(Continued)

OTHER PUBLICATIONS

Card, Stuart and David Nation. "Degree-of-Interest Trees: A Component of an Attention-Reactive User Interface." Davenation.com. Apr. 8, 2004. Xerox PARC. Feb. 26, 2008 <http://web.archive.org/web/20040408203355/http://davenation.com/doitree/doitree-avi-2002.htm>.*

(Continued)

*Primary Examiner*—Mohammad Ali
*Assistant Examiner*—Syed H Hasan
(74) *Attorney, Agent, or Firm*—Patrick J. S. Inouye; Krista A. Wittman

(57) ABSTRACT

Apparatus, methods, and computer program products are disclosed that perform computationally efficient layout of hierarchical data structures.

33 Claims, 9 Drawing Sheets

U.S. PATENT DOCUMENTS

| | | | |
|---|---|---|---|
| 6,327,567 B1 | 12/2001 | Willehadson et al. | 704/270 |
| 6,463,038 B1 | 10/2002 | Wilson | 370/261 |
| 2001/0053212 A1 | 12/2001 | Mark et al. | 379/202.01 |
| 2002/0065928 A1 | 5/2002 | Senga et al. | 709/231 |
| 2002/0103863 A1 | 8/2002 | Pearson | 709/204 |
| 2002/0118214 A1* | 8/2002 | Card et al. | 345/619 |
| 2002/0143877 A1 | 10/2002 | Hackbarth et al. | 709/205 |
| 2002/0172339 A1 | 11/2002 | Creswell et al. | 379/201.01 |
| 2003/0085931 A1* | 5/2003 | Card et al. | 345/853 |

OTHER PUBLICATIONS

Pietriga, Emmanuel. "IsaViz User Manual." W3.org. Aug. 8, 2003. W3C. Feb. 27, 2008 <http://web.archive.org/web/20030818160022/www.w3.org/2001/11/IsaViz/usermanual.html>.*

M. Ackerman et al., "Hanging on the Wire: A Filed Study of an Audio-Only Media Space," ACM Transactions on Computer-Human Interaction, vol. 4, No. 1, pp. 39-66 (Mar. 1998).

E. Addeo et al., "An experiment Multi-Media Bridging System," Bell Communications Research, pp. 236-242 (1988).

B. Arons, "A Review of the Cocktail Party Effect," Journal of the American Voice I/O Society, vol. 12, pp. 35-50 (1992).

L. Berc et al., "Pssst: Side Conversations in the Argo Telecollaboratiob System," Proceedings of UIST '95 Pittsburgh, PA, pp. 155-156 (Nov. 14-17, 1995).

S. Bly et al., "Media Spaces: Bringing People Together in a Video, Audio, and Computing Environment," Communications of the ACM, vol. 36, No. 1, pp. 27-47 (Jan. 1998).

P. Brady, "Effects of Transmission Delay on Conversational Behavior on Echo-Free Telephone Circuits," Bell Systems Technical Journal, vol. 50, pp. 115-134 (Jan. 1971).

M. Cohen et al., "Multidimensional Audio Window Management," International Journal of Man-Machine Studies, vol. 34, No. 3, pp. 319-336 (Mar. 1999).

M. Corner et al., "Zero- Interaction Authentication," Conference on Mobile Computing and Networking (MobiCom '02) (Sep. 23-28, 2002).

P. Dourish, "Awareness and Coordination in Shared Workspaces," In Proceedings of ACM CSCM '92 Conference on Computer Supported Cooperative Work, Toronto, Canada, pp. 107-114 (Nov. 1992).

C. Edelsky, "Who's Got the Floor?" Language in Society, vol. 10, pp. 383-421 (1981).

M. Egbert, "Schisming: The Collaborative Transformation Form a Single Conversation to Multiple Conversations," Research on Language & Social Interaction, vol. 30, No. 1, pp. 1-51 (1997).

G. Kleiter, "The Posterior Probability of Bayes Nets with Strong Dependences," Soft Computing, vol. 3, pp. 162-173 (1999).

Kwang Hong Lee, "Improptu: Audio Applciations for Mobile IP," Thesis submitted to Massachusetts Institute of Technology (Sep. 2001).

M. Meteer et al., "Application Develoment: Just the Facts," Speech Technology Magazine, printed from http://www.speechtechmag.com/pub/3_3/cover/445-1.html (Jun./Jul. 1998).

N. Morgan et al., "The Meeting Project at ICSI," Proceedings of HLT 2001, First International Conference on Human Language technology Research, J, Allan, ed.,Morgan Kaufmann, San Francisco, pp. 246-252 (2001).

E. Patterson et al., "Voice Loops as coordination Aids in Space Shuttle Mission Control," Computer Cupported Cooperative Work, vol. 8, pp. 353-371 (1999).

J. Rohlicek et al., "Gisting Conversational Speech," Proceedings of the 1992 IEEE International Conference of Acoustics, Speech and Signal Processing, vol. 2, pp. 113-116 (1992).

H. Sacks "Notes on Methodollgy," Atkinson, J. and Heritage, John (eds.): Structure of Social Action: Studies in Conversation Analysis, Cambridge University Press, pp. 21-27 (1984).

H. Sacks et al., "A Simplest Systematics for the Organization of Turn-Taking for Conversation," Language, vol. 50, pp. 696-735 (1974).

N. Sawhney et al., "Nomadic Radio: Speech and Audio Interaction for Contextual Messaging in Nomadic Environments," ACM Transactions on Computer-Human Interaction, vol. 7, No. 3, pp. 353-383 (2000).

E. Schegloff et al., "The Preference for Self-Correction in the Organization of Repair in Conversation," Language, vol. 53, pp. 361-382 (1977).

A. Sellen; "Remote Conversations: The Effects of Mediating Talk with Technology," Human-Computer Interraction, vol. 10, pp. 401-444 (1995).

J. Shell et al. "Interacting with Groups of Computers," Communications of the ACM, vol. 46, No. 3, pp. 40-46 (Mar. 2003).

A. Skaburskis et al., "AuraMirror: Artistically Visualizing Attention," CHI 2003, Ft. Luderdale, Florida (Apr. 5-10, 2003).

I. Smith et al., "Low Distrubance Audio for Awareness and Privacy in Media Space Applications," Proceedings of ACM Conference on Multimedia, San Francisco, CA: ACM (Nov. 1995).

R. Stiefelhagen et al., "Estimating Focus of Attention Based on Gaze and Sound," In IEEE PUI, Orlando, FL (2001).

R. Stiefelhafen et al., "Modeling Focus of Attention for Meeting Indexing Based on Multiple Cues," IEEE transactions on Neural Networks, vol. 13, No. 4, pp. 928-938 (Jul. 2002).

R. Stiefelhafen, "Tracking and Modeling Focus of Attention in Meetings," Dissertation, University of Karlsruhe (Jul. 5, 2002).

R. Stiefelhafen, "Tracking Focus of Attention in Meetings," Proceedings of the Fourth IEEE Internation conference on multimodal Interfaces (ICMI '02), Pittsburgh, PA (2002).

H. Strub "Concert Ralk: A Weekend with a Portable Audio Space," In Proceedings of the $6^{th}$ IFIP Conference on Human-Computer Interaction (Interact '97). Chapman and Hall, London, U.K.

W. Thomason et al., "Pauses, Transition Relevance, and Speakse change," Human Communication Research, vol. 18, No. 3, pp. 429-444 (Mar. 1992).

D. Traum et al., "Embodied agents for Multi-Party Dialogue in lmmersive Virtual Worlds," AAMAS '02, First Joint Conference Autonomous Agents & Multi-Agent Systems, vol. 2, pp. 766-773 (2002).

R. Vertegaal et al, "Gaze-2: Conveying Eye Contact in Group Video Conferencing Using Eye-Controlled Camera Direction," CHI 2003, Ft. Aluderdale, Florida (2003).

S. Whittaker et al., "Informal Workplace Communication: What Is it Like and How might We Support It?" Human Factors in Computing Systems, Boston, Massachusetts, Apr. 24-28, pp. 131-137 (Apr. 24-28, 1994).

L. Wilcox et al., "Training and Search Algorithms for an Interactive Wordspotting System," Proceedings of the International Conference on Acoustics, Speech and Signal Processing, pp. 97-100 (Mar. 1992).

J. Wilpon et al., "Automatic Recognition of Keywords in Unconstrained Speech Using Hidden Markov Models," IEEE Transaction on Accoustics, Speech and Signal Processing, vol. 38, No. 11, pp. 1870-1878 (Nov. 1990).

T. Wilson et al., "The Structure of Silence Between Turns in Two-Party Conversation," Discourse Processes, vol. 9, pp. 375-390 (1986).

J. Ye et al., "Phoneme Classification Using Naïve Bayes classifier in Reconstructed Phase Space," IEEE Digital Signal Processing Workshop (2002).

S. Basu, "Conversational Scene Analysis" Thesis of the Degree of Doctor of Philosophy in Electrical Engineering and Computer Science at the Massachussets Institute of Technology (Sep. 2002).

M. Bull et al., "An Analysis of the Timing of Turn-Taking in a Corpus of Goal-Oriented Dialogue," Proceedings of ICSLP '98: International conference on Spoken Language Processing (ICSLP), vol. 4, pp. 1179-1182 (Nov. 30-Dec. 4, 1998).

* cited by examiner

METHOD, APPARATUS, AND PROGRAM PRODUCT FOR VISUALIZING TREE STRUCTURED INFORMATION

This application claims the benefit under 35 USC 119(e) to prior copending provisional application 60/682888 filed May 20, 2005.

The U.S. Government has a paid-up license in this invention and the right in limited circumstances to require the patent owner to license others on reasonable terms as provided for by the terms of MDA904-03-C-0404 awarded by ARDA.

BACKGROUND

1. Field

This technology disclosed herein relates to the field of visualizing hierarchical data structures.

2. Background

There are many prior-art techniques for the visualization of hierarchical data structures (tree structures) that interconnect nodes. Examples of hierarchical data structures include file systems, organization charts, and taxonomies. In addition, many other richer graph structures, such as web sites, family trees, and social networks, are amenable to hierarchical data structure-based visualizations. Exponential increases in processing power, networking, and immense data storage have given rise to increasingly massive data sets and the need to visualize this information.

There is a problem with massive data sets being presented on limited display areas when the breadth or depth of a visualization of a hierarchical data structure exceeds the bounds of the display area. Common approaches to this problem use scrolling, panning, and/or scaling techniques. In addition, some techniques allow the visualization of the nodes to overlap (for example, most cone-tree embodiments).

A "Degree-Of-Interest" Tree (DOITree) can be represented as a hierarchical data structure where the nodes contain (or are associated with) an interest value (such as a degree-of-interest) and a payload. The layout of the DOITree structure and the payload depends on an interest value associated with each node in the tree. Some versions of DOITrees are interactive trees with animated transitions that fit within a bounded region of space and whose layout depends dynamically on the user's estimated degree-of-interest. DOITrees can use focus+context techniques to achieve the goals of logical filtering of nodes, using the estimated degree-of-interest to determine which nodes to display; geometric distortion, changing node sizes to match the estimated interest; semantic zooming of content based on node size; and aggregate representations of elided subtrees.

Similar in spirit to DOITrees is Plaisant et al.'s SpaceTree, which uses logical filtering and aggregation of nodes, combined with animation and automated camera management, to visualize tree structures. SpaceTree supports multiple foci, search, and filtering. However, for large hierarchical data structures SpaceTree usage often requires significant manual panning.

The visualization of massive data sets using exiting algorithms is computationally expensive. It would be advantageous to provide an improved, computationally efficient, visualization of hierarchical data structures that allows multiple foci and that can be presented within a constrained display area.

DESCRIPTION

Figure 1:
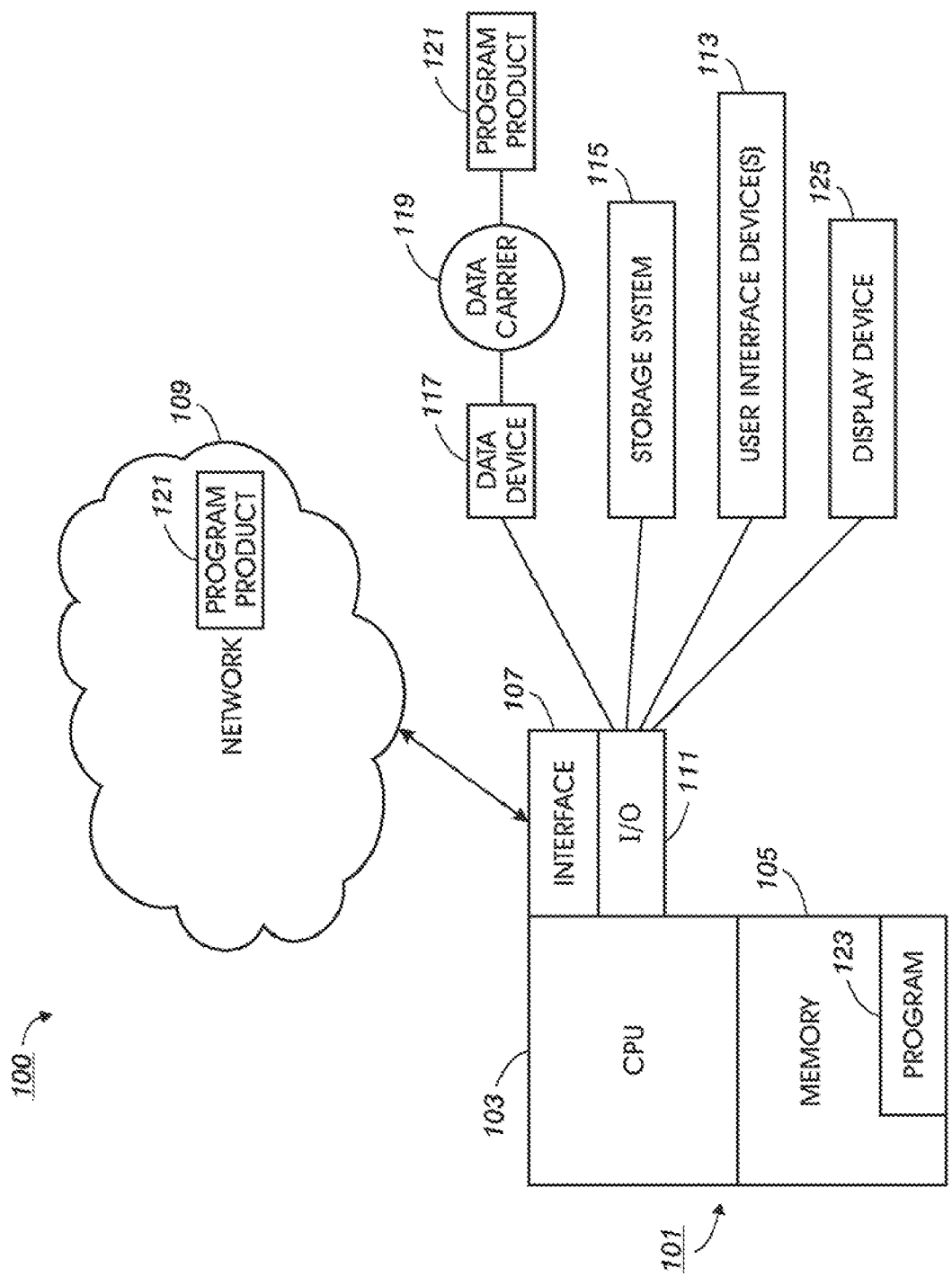
FIG. 1 illustrates a networked computer system that can utilize the disclosed technology.

One aspect of the technology disclosed herein for a computationally efficient layout of a hierarchical data structure includes a method of receiving the hierarchical data structure that contains information that can be presented within a constrained display area. The constrained display area having a constrained depth extent and a constrained breadth extent. The hierarchical data structure including nodes that have a respective node interest characteristic. Once the hierarchical data structure is received, it is used to construct a block representation represented by block descriptors, that are associated with depth levels each which have a depth level breadth extent. Once the block representation is constructed, it is used to determine whether the respective depth level breadth extent for one of the depth levels exceeds the constrained breadth extent. This depth level is associated with at least one of the block descriptors that is, in turn, associated with a first subset of the nodes. The respective depth level breadth extent is responsive to the extents of the first subset of the nodes. Once the extent of a depth level is determined to be too large, the nodes in the depth level are sorted by the respective node interest characteristic and partitioned into an elided subset and a visualized subset, the depth level breadth extent being reduced by the extents of the elided subset to not exceed the constrained breadth extent. Once the depth level extent is reduced such that the visualized subset of the nodes making up the depth level can fit within the constrained display area, the nodes in the visualized subset are positioned and their information presented within the constrained display area.

The following 'notations and nomenclature' are provided to assist in the understanding of the disclosed technology and the embodiments thereof.

Data Structure—A data structure is an ordered arrangement of storage for variables. A data structure can be as simple as a small integer, or as complex as a relational database.

Pointer—A pointer is a data value that is used to reference a data structure or an object. One skilled in the art will understand that "pointer" includes, without limitation, a memory address to, or a value used to calculate the address to the information of interest and any functional equivalents including handles, hashes and/or similar constructs as well as database or registry keys and their equivalents.

Procedure—A procedure is a self-consistent sequence of steps that can be performed by a programmed computer, specialized electronics or other circuitry or a combination thereof that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other logic circuitry.

FIG. 1 illustrates a networked computer system 100 that can incorporate an embodiment of the technology herein disclosed. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a ROM within the device, within replaceable ROM, in a computer-usable data carrier such as a memory stick, CD, floppy, DVD or any other tangible media) that typically contains or provides a program product 121. The user interface device(s) 113 can include a display device 125. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network transmits information (such as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted from one point to another. Programs and data are commonly provided by reading the data read from both tangible physical media (such as those listed above) and from the network 109. Thus the network 109, like a tangible physical media, is a computer-usable data carrier. One skilled in the art will understand that not all of the displayed features of the computer 101 need to be present use the claimed technology. In particular, the network 109 is not needed if the program 123 is accessed from the removable data device 117 or the storage system 115.

The hierarchical data structure layout technology described herein was initially developed to improve the computational efficiency of, the visualization of, and the user interaction with DOITrees. However, the layout technology can be applied to any hierarchical data structure that includes information that can be presented or visualized. This information is often textual in nature. The DOITree can be presented (displayed) as a visualization. The user can select one or more nodes on the visualization and designate them as focus-nodes (for example, to support comparison across tree branches). Some DOITree browsers can also designate search terms as focus-nodes. Other focus-nodes can be pegged nodes, that is, nodes that a user desires to always be displayed. As the user has provided input into his/her interest, the underlying focus+context engine can redistribute the estimated interest between the nodes and provide a set of possibly visualized nodes within a hierarchical data structure for visualization using the technology disclosed herein. In addition, some embodiments will initiate a smooth, slow-in slow-out animation between tree configurations. For example, newly visible nodes can flow out from their parents, while other previously visible nodes become hidden, returning to their parents and fading out to transparency, ultimately being replaced by an elision graphic indicating the size of the unexpanded subtree. In one embodiment, newly visible nodes are initially highlighted to help users track the appearance of previously unseen information.

One embodiment of the underlying focus+context engine is disclosed by U.S. Pat. No. 6,944,830, issued Sep. 13, 2005, and hereby incorporated by reference. The underlying DOI-Tree technology provides a hierarchical data structure for visualization to the subsequently described layout technology. One skilled in the art will understand that any hierarchical data structure having nodes that contains or reference a respective node interest characteristic, no matter how constructed can use this layout technology and that the layout technology can be used for visualization of data sets other than that sourced by DOITrees.

Figure 10:
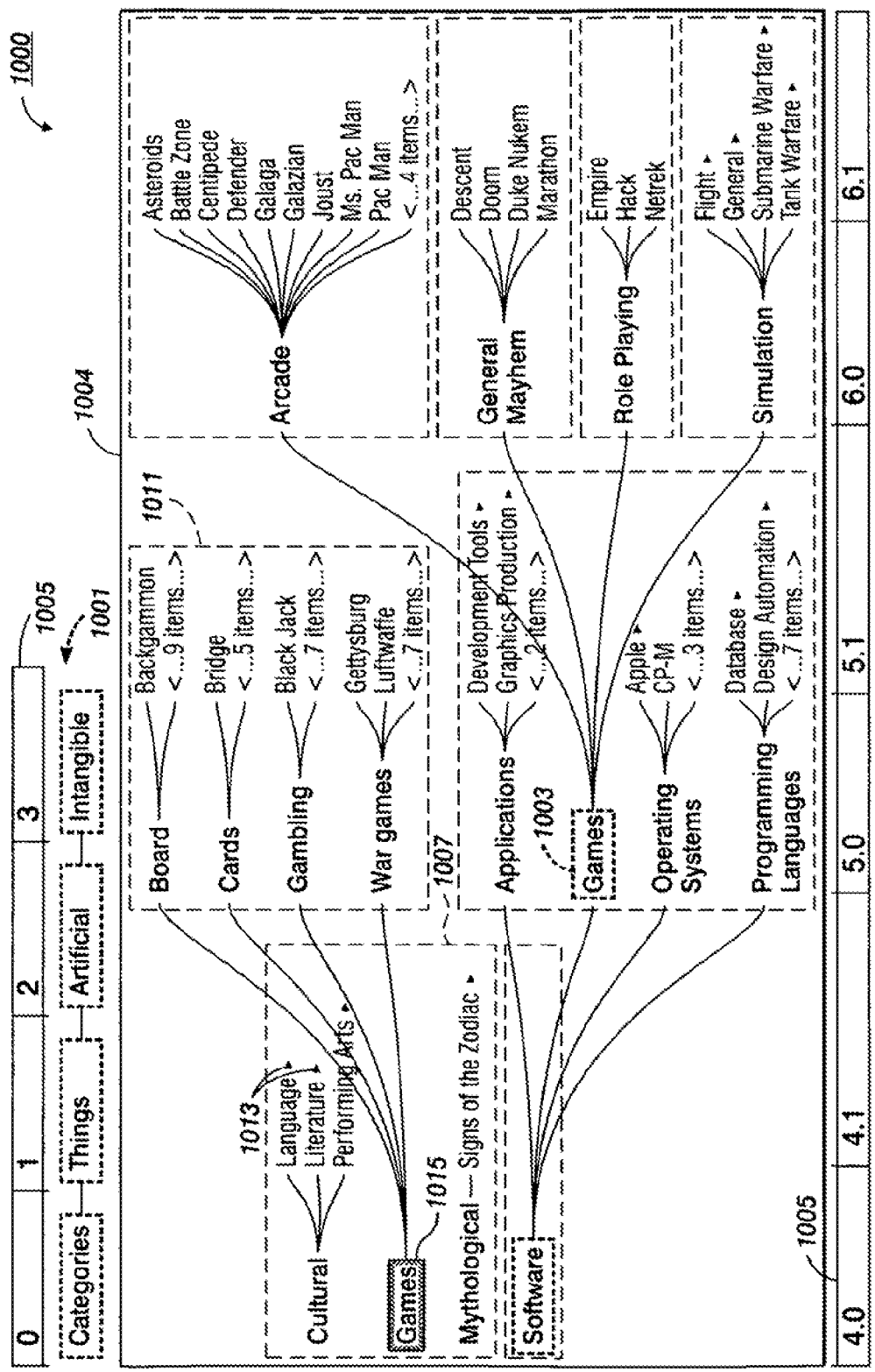
FIG. 10 illustrates an example visualization image of a hierarchical data structure showing features resulting from the disclosed technology.

The layout technology disclosed herein presents a visualization of the supplied hierarchical data structure by expanding multiple tree branches responsive to the focus-node(s), and maximizing the allocated space for each expanded branch within the constrained breadth extent of the constrained display area of the display. Deeper tree paths expand to use up available space underneath other, shorter tree paths. When the breadth of the expanded tree branches exceeds the constrained breadth extent, the nodes of lowest estimated interest are automatically culled until the branch fits within the constrained display area. In some embodiments these culled nodes (elided nodes) can be indicated with an aggregate representation as is shown in FIG. 10. In these embodiments, if the user then selects the aggregate, the underlying focus+context engine can redistribute the interest between the nodes in the branch and provide an updated hierarchical data structure for visualization. This expands the aggregate, revealing hidden nodes, while aggregating previously visible nodes.

As increasingly deeper levels of the tree are visualized, the depth of the supplied hierarchical data structure may exceed the constrained depth extent of the constrained display area of the display. As was previously described, scrolling/panning and scaling techniques can be applied. In one embodiment, the visualization technology provides automatic panning of the hierarchical data structure visualization responsive to the most recent user-selected focus-node. To provide tree context, the visualization technology maintains tree context by presenting an "elided depth level trail" of ancestor nodes along the periphery of the visualization (see FIG. 10). A user can designate one of the ancestor nodes in the elided depth level trail node to be a focus-node with the expected redistribution of interest and resulting visualization update. Other nodes can be designated as pegged nodes. Pegged nodes are focus-nodes that the user desires to always have visualized, and need not be in the branch of the user's most recently selected focus-node.

In some embodiments, (for example, an information browser) nodes that match a query can be highlighted (and/or designated as focus-nodes that causes all filtered branches containing search hits to be expanded) in the visualization. Furthermore, subtree aggregates can be highlighted to indicate branches containing search hits. A linear list of search results can be made available to the user; and activation of an entry in the results list takes the user to that section of the tree.

In one embodiment, lightweight modeling of the user's interest can be used to inform the layout and presentation of the hierarchical data structure. User interest can be modeled using a Degree-Of-Interest (DOI) function that assigns a value representing the estimated relative interest of the user to each node in the structure. Computed degree-of-interest values, as well as any other interest characteristic, can be used to affect the layout of the hierarchical data structure when it is visualized.

In one embodiment, a multi-focal degree-of-interest function can assign a maximal degree-of-interest to focus-nodes and their parent nodes, up to the root of the tree. Degree-of-interest values for the remaining nodes then decrease as a function of distance from the nodes having higher degree-of-interest. Because nodes below a particular degree-of-interest threshold will not be visualized, the degree-of-interest calculation can be stopped at "disinterest threshold" boundaries, thus bounding computation time to only the number of possibly visualized nodes.

Once the focus+context engine has assembled a hierarchical data structure of potentially visualized nodes where each node includes a respective node interest characteristic (such as a degree-of-interest value, a rank, a priority, or classification), it provides the resulting hierarchical data structure to the layout process. The layout process is subsequently described.

Figure 2:
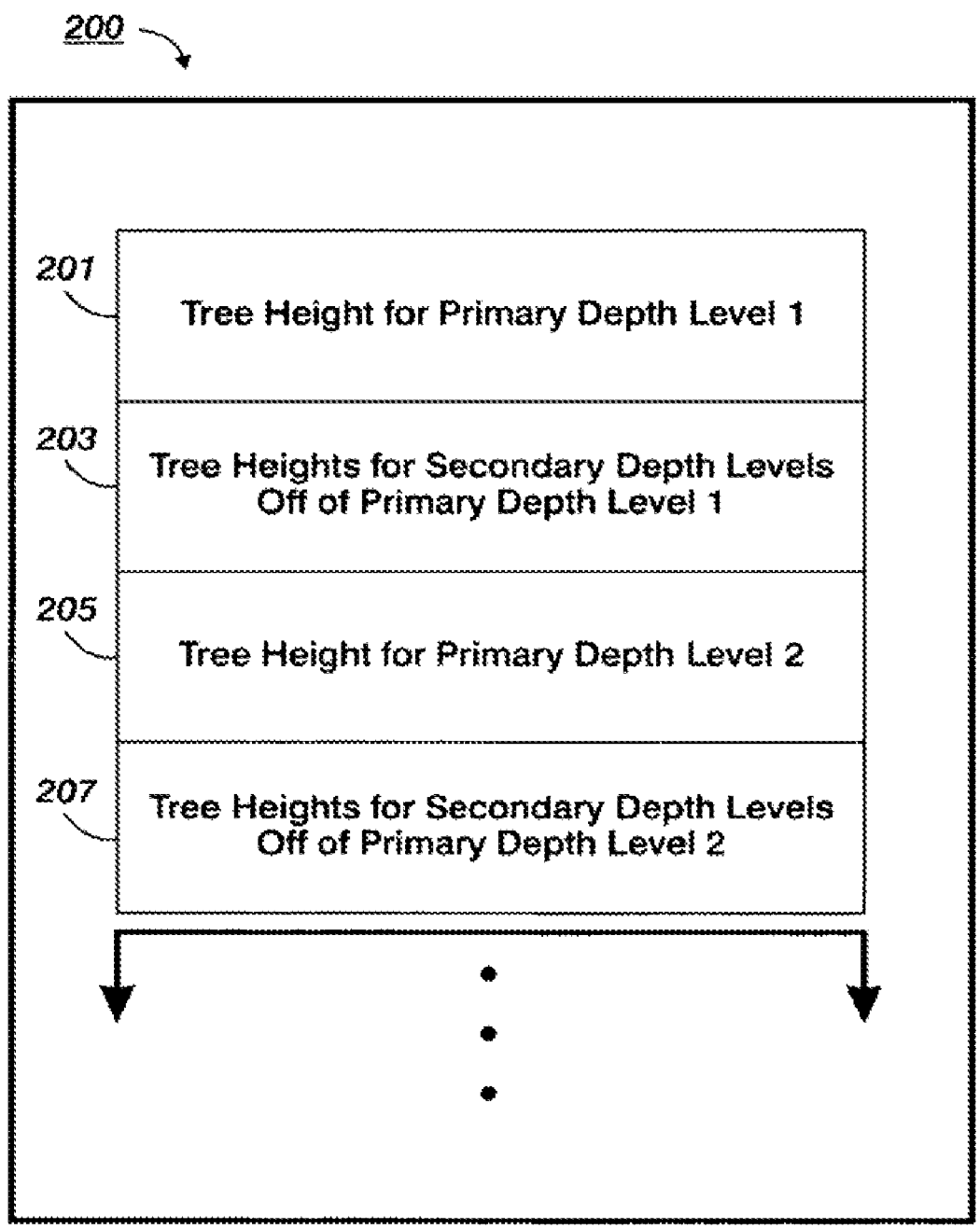
FIG. 2 illustrates one embodiment of a 'depth level' data structure.
Figure 3:
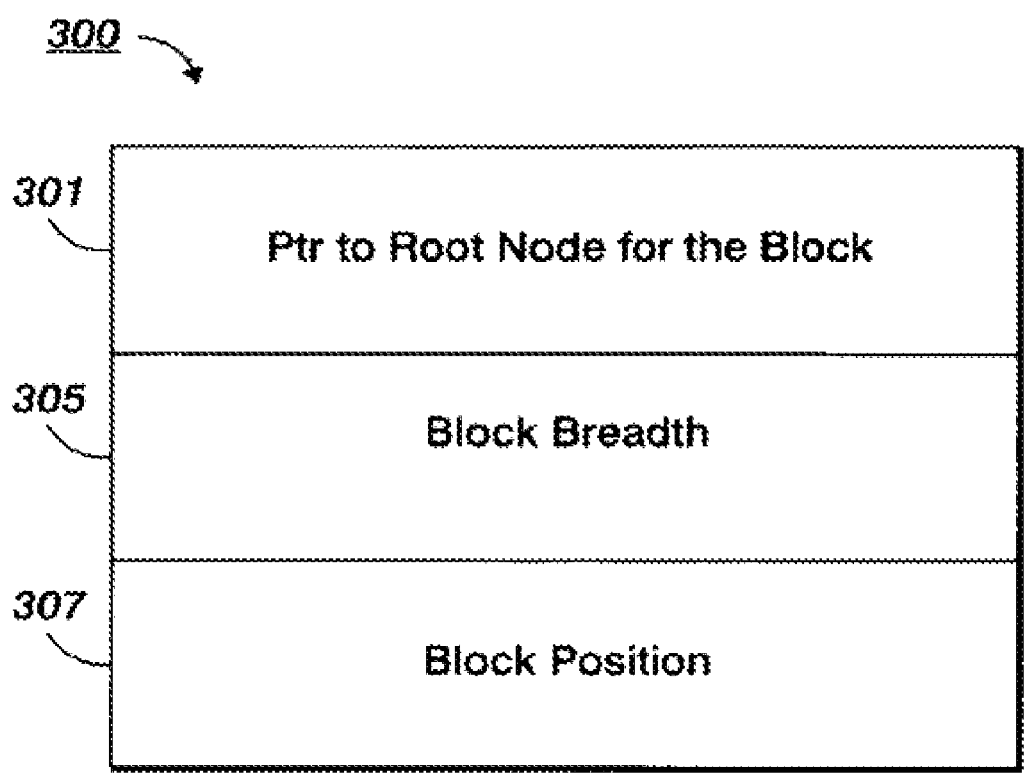
FIG. 3 illustrates one embodiment of a 'space list' entry.

A layout process 400 uses two data structures that are described with respect to FIG. 3 and FIG. 2. One skilled in the art will understand that these data structures are but one of many equivalent data structures that can be used in procedural, object-oriented, or other programming methodologies.

FIG. 2 illustrates a 'depth level' data structure 200 that maintains the height in display coordinates of the depth levels associated with the hierarchical data structure. There are two types of fields in the 'depth level' data structure 200 as represented by a 'height for primary depth level 1' field 201 and a 'heights for secondary depth levels off of primary depth level 1' field 203. Similar fields exist in the 'depth level' data structure 200 for each depth level (for example a 'height for primary depth level 2' field 205 and a 'heights for secondary depth levels off of primary depth level 2' field 207. A primary depth level contains at least one focus-node or contains a node that is a direct child node of a focus-node. The primary depth levels contain a value that represents the height of the specified level of portion of the hierarchical data structure that may be visualized. The values in the secondary depth level fields contain the heights of the corresponding child branches of the hierarchical data structure that does not contain a focus-node.

In some embodiments, entries in the 'depth level' data structure 200 can be accessed using a registry and a key system, a linked list, or any other storage structure known to one skilled in the art now or in the future.

FIG. 3 illustrates a 'space list' entry 300 that can be accessed from a space list structure. The space list structure provides access to the blocks that will be used to position and visualize the hierarchical data structure that is provided to the layout process 400. The 'space list' entry 300 contains a 'pointer to root node for block' field 301 that points to the parent node in the hierarchical data structure. A 'block breadth' field 305 maintains the breadth of the block representation (including any secondary block representations contained within the block representation—secondary block representations generally do not enclose other block representations and so simply contain the breadth of the secondary block representation itself). In one embodiment, the value contained in a 'block position' field 307 represents the horizontal coordinate for the left most edge of the block. Each block spans the secondary depth levels within its primary depth level. In one embodiment, blocks span a single primary depth level. The blocks are indexed by their depth level in the space list, while the depths of subtrees are indexed by their sub-level, as depicted by the markers at the top of the figure. This segregation allows each depth level of the hierarchical data structure to be separately considered with respect to space constraints and positioning, in turn enabling a flexible handling of multiple foci. The 'depth level' data structure 200 and the space list are mapped using methods known to one skilled in the art (for example, but without limitation, by the use of a hashmap structure).

Figure 4:
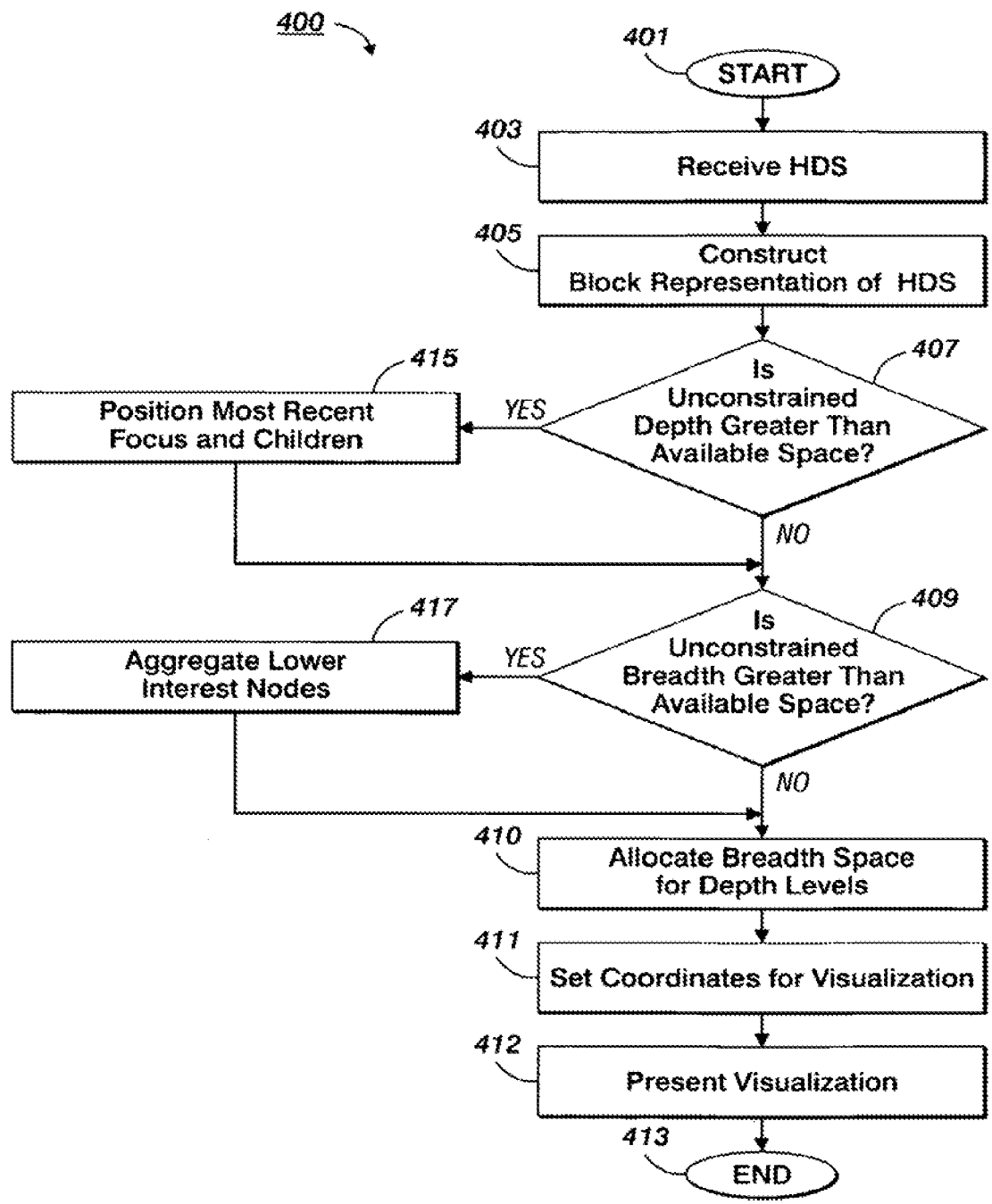
FIG. 4 illustrates one embodiment of a layout process.

FIG. 4 illustrates the layout process 400 that can be invoked to prepare a hierarchical data structure for display within a constrained display area that has a constrained breadth extent and a constrained depth extent. The layout process 400 initiates at a start terminal 401 and continues to a 'receive hierarchical data structure' procedure 403 that receives the hierarchical data structure. The hierarchical data structure contains information that can be presented within a constrained display area. The constrained display area has a constrained depth extent and a constrained breadth extent. The hierarchical data structure includes a number of nodes, each of which contain a respective node interest characteristic that can be a degree-of-interest value. The constrained display area can be a view in a window or otherwise dimensioned area intended for the presentation of the visualized portion of the hierarchical data structure.

The first phase of the layout process 400 computes the space taken by the hierarchical data structure in the absence of any display constraints and simultaneously segments the hierarchical data structure into a block structure to simplify subsequent layout calculations. One result of this phase is an initial layout of the hierarchical data structure assuming an unconstrained display area and that the entire hierarchical data structure is to be visualized. The initial layout provides an initial breadth extent value and an initial depth extent value. The first phase also populates the 'depth level' data structure 200 and the 'space list' entry 300 and thus creates a block representation of the hierarchical data structure.

A 'construct block representation of the hierarchical data structure' procedure 405 performs the first pass through the hierarchical data structure, computes the initial layout and segments the hierarchical data structure into a block representation that is an abstraction of the hierarchical data structure as is subsequently described with respect to FIG. 5.

The second phase of the layout process 400 compares the initial breadth extent and the initial depth extent against the bounds of the display area (the constrained depth extent and the constrained breadth extent). If the initial depth extent and the initial breadth extent do not exceed the available display area, the initial layout is presented on the display area.

However, if either of the initial depth extent or the initial breadth extent exceeds the bounds of the display area, the layout of the hierarchical data structure must be reduced from that of the initial layout.

A 'depth constrained' decision procedure 407 determines whether the initial depth extent of the hierarchical data structure is greater than the constrained depth extent for the display. If the initial depth extent is not greater than the constrained depth extent the layout process 400 continues to a 'breadth constrained' decision procedure 409 that determines whether the initial breadth extent is greater than the constrained breadth extent. If the initial breadth extent is not greater than the constrained breadth extent, all the block representations are known to fit within the constrained breadth extent and the layout process 400 continues to an 'allocate breadth space for depth level' procedure 410 to actually position the block representations within the constrained breadth extent as is subsequently described with respect to FIG. 8. Once the block representation are positioned, an 'assign coordinates for visualized nodes' procedure 411 assigns display coordinates for each block and visualized node. A 'present visualization' procedure 412 then presents the visualized nodes (and/or the block representation visualization) such as on a display device, printer, or by storage in file. The layout process 400 completes through an end terminal 413.

If the 'depth constrained' decision procedure 407 determines that the initial depth extent is greater than the constrained depth extent, the layout process 400 continues to a 'position to most recent focus-node' procedure 415 that first locates the block representation that includes the most recently selected focus-node and its siblings and positions the visualization such that the siblings of the focus-node are within the display area. Some of the depth levels that include ancestor blocks of the focus-node may be elided from the detailed visualization and located in an elided depth level trail representation. The elided depth level trail representation of the elided ancestors helps the user maintain context within the visualization and to provide immediate access to the ancestral levels of the hierarchical data structure. This approach can be used separately from, or in conjunction with, prior art techniques for scaling, scrolling, or panning the initial layout to fit within the display area. (Excessive scaling, however, eventually destroys the legibility of displayed information.)

In one embodiment, the positioning is determined by counting how many depth levels, starting from the root, must be removed to allow the user-selected focus-node and its children to fit into the center of the display area.

In one embodiment, hysteresis logic is used to control undue disruption of the visualization due to location changes in the visualization of the focus-node that can result as the user browses a group of siblings with descendants of shifting depth requirements.

In the case of excessive breadth, aggregation can be applied in addition to, or in lieu of, scaling. For a given depth level with excessive breadth, aggregation elides the nodes of lowest interest until the breadth of the depth level is sufficiently reduced to fit within the constrained breadth extent of the display area. Elided nodes can be represented by an aggregate visualization (see FIG. 10 and its description).

If the 'breadth constrained' decision procedure 409 determines that the initial breadth extent for all the block representations is greater than the constrained breadth extent, the layout process 400 continues to an 'aggregate nodes' procedure 417 that aggregates the less interesting nodes as is subsequently described with respect to FIG. 7. This second path through the hierarchical data structure enforces space constrains imposed by the constrained breadth extent and the constrained depth extent.

After the 'aggregate nodes' procedure 417, the layout process 400 continues to the 'allocate breadth space for depth level' procedure 410 for processing as previously described.

In the final phase of the layout process 400, the block representation and information from the visualized subset of nodes are assigned their screen co-ordinates by an 'assign coordinates for visualized nodes' procedure 411. This pass iterates through each depth level from the root of the hierarchical data structure down, at each level first determining the position of the block representations and then laying out the nodes that each block representation contains with respect to the visualization of the block representation. Iterating through depth levels visits nodes in a breadth-first fashion, ensuring that parent nodes have their positions assigned before children blocks are considered. Once the display coordinates for the block representations and nodes are determined, a 'present visualization' procedure 412 presents the visualization of the hierarchical data structure (for example, on a display device such as a one or more monitors or printers; or stores the visualization as data in computer-readable storage for later playback and presentation). After the information is presented, the layout process 400 completes through an end terminal 413.

Figure 5:
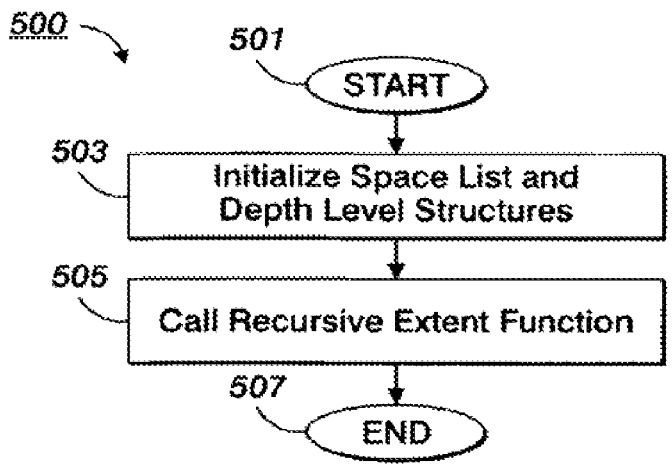
FIG. 5 illustrates one embodiment of a 'construct block representation of the hierarchical data structure' process that can be invoked by the layout process of FIG. 4.

FIG. 5 illustrates a 'construct block representation of the hierarchical data structure' process 500 that can be invoked after the 'receive hierarchical data structure' procedure 403, that initiates at a start terminal 501, and continues to an 'initialize space list and depth levels structures' procedure 503. The 'construct block representation of the hierarchical data structure' process 500 constructs a block representation of the hierarchical data structure that includes a number of block descriptors that are associated with the depth levels and computes the initial breadth extents and the initial depth extents needed to present the entire hierarchical data structure in the absence of any constrained display area considerations (the initial layout) as well as a respective depth level breadth extent for each depth level. This process simultaneously segments the hierarchical data structure into a block representation specified by the 'depth level' data structure 200 and the space list that contains entries such as the 'space list' entry 300. The block representation simplifies subsequent layout calculation.

Figure 6:
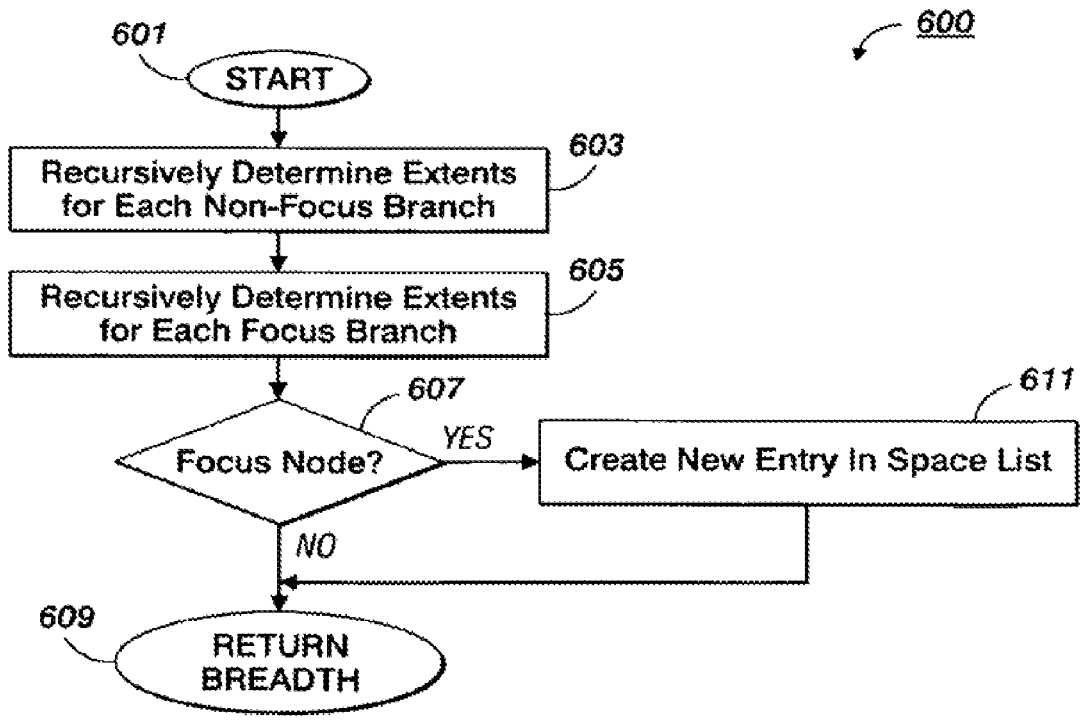
FIG. 6 illustrates one embodiment of a 'recursive extent' function that can be invoked by the 'construct block representation of the hierarchical data structure' process of FIG. 5.

The 'initialize space list and depth levels structures' procedure 503 initializes the space list and the 'depth level' data structure 200 as well as any other required initialization. After the data structures are initialized, an 'invoke recursive extent function' procedure 505 recursively traverses the hierarchical data structure to create an initial layout and to calculate the initial breadth extent and the initial depth extent that would be required to present the initial layout of the hierarchical data structure. In addition, a block representation of the hierarchical data structure is created in the space list (using entries such as the 'space list' entry 300) in association with the 'depth level' data structure 200. The result of the 'construct block representation of the hierarchical data structure' process 500 is the generation of the breadth and depth, in pixels, of the unconstrained hierarchical data structure layout, and an aggregated block representation of the hierarchical data structure FIG. 6 illustrates a 'recursive extent' function 600 that can be invoked by the 'invoke recursive extent function' procedure 505. The 'recursive extent' function 600 performs a depth-first traversal of the hierarchical data structure and computes the breadth and depth requirements for each block representation and its group of siblings. The 'recursive extent' function 600 also maintains global data structures representing the depth requirements for each level of the hierarchical data structure. This allows depth requirements for particular levels of the hierarchical data structure to be dynamically computed across different branches of the hierarchical data structure.

The 'recursive extent' function 600 initiates at a start terminal 601 and continues to a 'recursively determine extents for each non-focus branch' procedure 603 that computes the maximum depth for each branch of the hierarchical data structure that does not include a focus-node. It does this by storing depth calculations for each secondary depth level while calculating breadth values for each node that is not a focus-node. Next, a 'recursively determine extents for each focus branch' procedure 605 computes the maximum height for each branch that contains a focus-node and calculates the breadth values for each primary block. In addition, the 'recursive extent' function 600 computes the maximum height for the current depth level as the maximum of the focus-node heights for all the non-focus branches and calculates the height for the primary depth level. In addition, the 'recursive extent' function 600 maintains the maximum breadth global.

A 'focus-node' decision procedure 607 determines whether the node is a focus-node. If not the 'recursive extent' function 600 returns the calculated breadth of the node through a 'return breadth' function terminal 609. If the node is a focus-node, the 'recursive extent' function 600 continues to a 'create new space list entry' procedure 611 that allocates and enters an entry such as the 'space list' entry 300 to the space list (thus, defining a new block presentation).

One skilled in the art will understand that the programmed-function represented by the flowchart illustrated in FIG. 6 recursively calls itself. One skilled in the art, having access to FIG. 6 and the associated descriptions herein will be able to practice this embodiment without undue experimentation.

Aggregates are computed by sorting all the nodes in the given depth level by the value of their respective node interest characteristic (for example, a degree-of-interest value), then sequentially removing the lowest-interest nodes and updating size calculations until the visualization of the block representations in the depth level will fit within the constrained breadth extent. Since the lowest-interest nodes may be dispersed throughout the given depth level, is requires some book-keeping of elided nodes, and updating size calculations when adjacent nodes are marked for aggregation.

Figure 7:
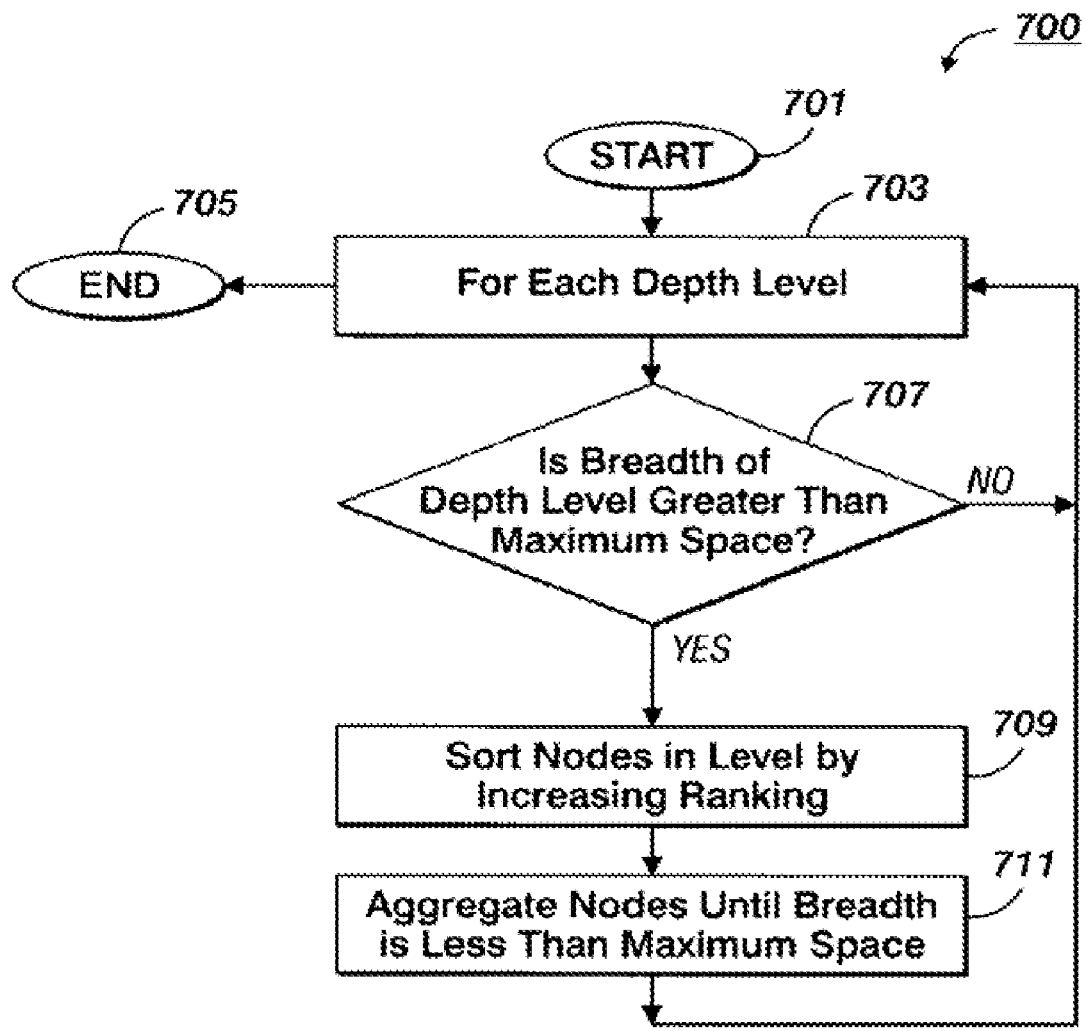
FIG. 7 illustrates one embodiment of an 'aggregate nodes' process that can be invoked by FIG. 4.

FIG. 7 illustrates an aggregate nodes' process 700 that can be invoked by the 'aggregate nodes' procedure 417, that initiates at a start terminal 701, and continues to a 'for each depth level' iteration procedure 703 that iterates over each depth level. Once all the depth levels are iterated, the aggregate nodes' process 700 completes through the end terminal 705.

For each iterated depth level, a 'breadth of depth level>constrained breadth extent' decision procedure 707 determines whether depth level breadth extent required by the block representations in the iterated depth level (the depth level breadth extent) exceeds the constrained breadth extent. If not, the aggregate nodes' process 700 continues to the 'for each depth level' iteration procedure 703 to iterate the next depth level.

If the depth level breadth extent (the sum of the breadth of the blocks in the depth level) exceeds the constrained breadth extent, the aggregate nodes' process 700 continues to the 'sort nodes by increasing interest' procedure 709 that sorts the nodes in the depth level by their respective node interest characteristic.

Next, an 'aggregate nodes until breadth<maximum space' procedure 711 iterates through the set of nodes in the hierarchical data structure that are in the iterated depth level and marks those nodes that have a lower interest characteristic as belonging to the elided subset ("not visible" subset) until the depth level breadth extent fits within the constrained breadth extent. The remaining nodes are members of the visualized subset. While any appropriate partitioning mechanism can be used to partition the subset of nodes in the depth level, in one embodiment, a Boolean array is created that represents whether a corresponding node is elided. Then, the Boolean array is examined for appropriate true/false runs to determine where an aggregation node is to replace two or more adjacent siblings.

Once all the nodes on the depth level have been processed, iterate through the elided nodes in order. For each run of elided nodes (two or more adjacent siblings marked as elided) disable visualization of the node, and where appropriate replace the run of elided nodes with an aggregated node and add the aggregated node to the visualized subset. Update the value of the 'block breadth' field 305 in the corresponding 'space list' entry 300 accordingly.

Figure 8:
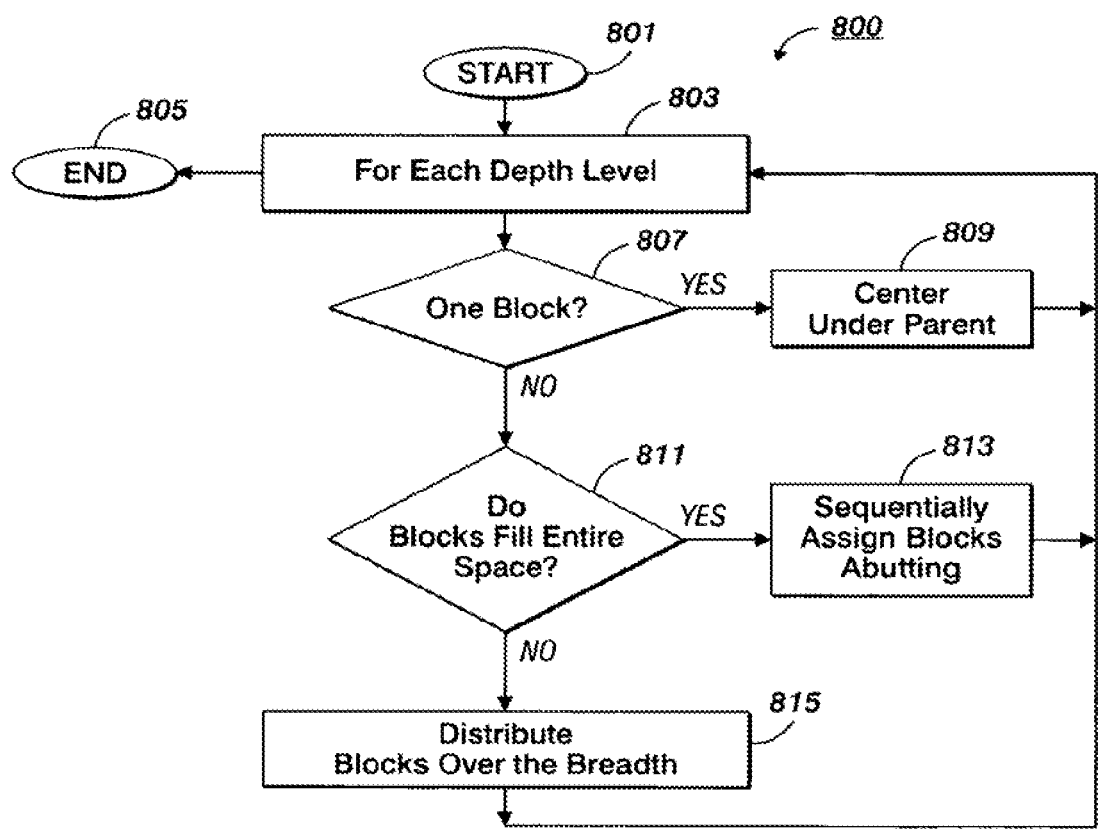
FIG. 8 illustrates one embodiment of an 'allocate breadth' process that can be invoked by the layout process of FIG. 4.

FIG. 8 illustrates an 'allocate breadth' process 800 that can be invoked by the 'allocate breadth space for depth level' procedure 410. The visualization of a child block representation (or the nodes associated with it) is preferably located underneath (in the depth direction) their parent's block representation visualization. Due to the constrained display area this is not always possible. Nevertheless, it is useful to minimize the distance between parents and children. One embodiment uses a greedy optimization algorithm, for the most common situation, that processes block representations within a depth level from the "outside-in," beginning with block representations having visualizations nearest the edges of the constrained display area and centering them under their parents without exceeding the constrained breadth extent or overlapping. Then the amount of space needed for the remaining block representations in the depth level is determined. If sufficient space does not exist for visualizing the remaining block representations the optimization algorithm pushes the visualizations of the current block representations towards the boundaries of the constrained display area as necessary to free the required space. The distance each block representation visualization is moved is proportional to its breadth because larger blocks can move further and still be directly underneath (though not centered under) their parent block. This process is then repeated for the pair of blocks adjacent to the previous ones, until either all blocks have been positioned or there is only a single block left (in which case, we simply place the block within the remaining space, aligning its center as close as possible to its parent).

The 'allocate breadth' process 800 initiates at a start terminal 801 and continues to a 'for each depth level' iteration procedure 803 that iterates each depth level. Once all the depth levels have been iterated, the 'allocate breadth' process 800 completes through the end terminal 805.

As each depth level is iterated, a 'single block in level' decision procedure 807 determines whether the depth level includes only one block representation. If so, the 'allocate breadth' process 800 continues to a 'center under parent' procedure 809 that centers the visualization of the block representation under its parent visualization (subject to boundary conditions and the probation against overlapping visualizations). The 'allocate breadth' process 800 returns to the 'for each depth level' iteration procedure 803 for the next iteration.

If the depth level has more than one block representation, the 'allocate breadth' process 800 continues to a 'blocks fill breadth' decision procedure 811 that determines whether the visualizations of the block representation in the depth level fill the entire breadth. If so, the 'allocate breadth' process 800 continues to an 'abutting blocks' procedure 813 that places visualizations of the block representations adjacent to each other, and then the 'allocate breadth' process 800 continues to the 'for each depth level' iteration procedure 803 for the next iteration.

If the depth level has more than one block representation and yet does not fill the entire breadth, the 'allocate breadth' process 800 continues to a 'distribute blocks over breadth' procedure 815 that first centers the visualizations of the first and last block representations in the depth level under their parent block visualizations (but not overlapping and not extending outside of the display area for the visualization. If there is not enough space between the two blocks for the rest of the blocks, put the current blocks towards the edges of the display until there is enough space. Then recursively repeat for the next outermost block representations with the new currently-available free breadth.

Figure 9:
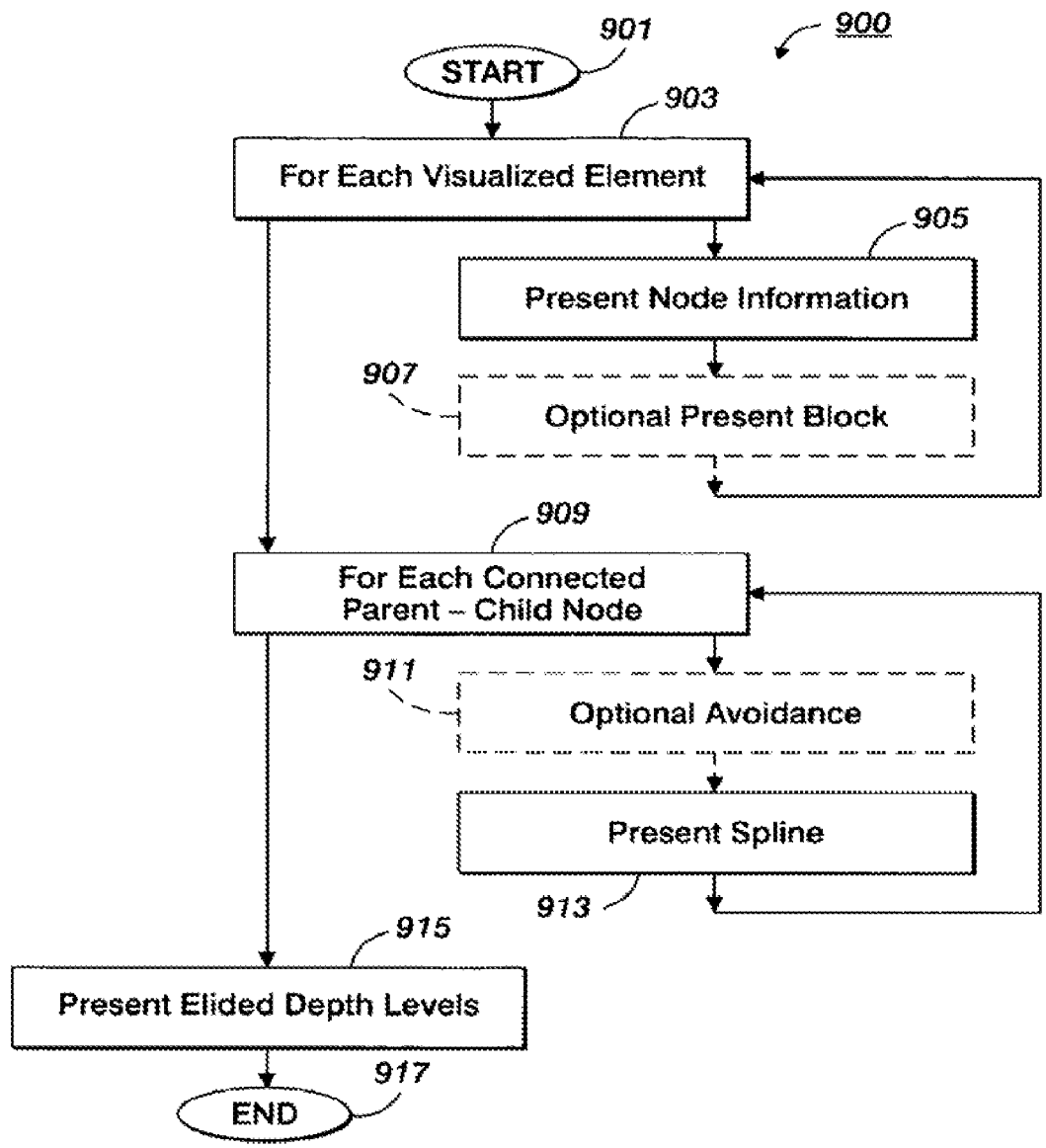
FIG. 9 illustrates a presentation process that can be invoked by FIG. 4.

Once the blocks for a given level have been positioned, the provided bounds are used to position the nodes and aggregates within the blocks by a depth-first traversal of the block content. FIG. 9 illustrates a presentation process 900 that can be used to present the information from the visualized nodes and aggregated nodes, that can be invoked by the 'present visualization' procedure 412 of FIG. 4, that initiates at a start terminal 901, and that continues to a 'for each visualized element' iterative procedure 903 that iterates over each visualized node, aggregate, and optionally each block representation.

As each node is iterated, a 'present node information' procedure 905 presents the information contained by the visualized node or aggregated node. In addition, an 'optional present block information' procedure 907 can be conditioned to optionally present the outline of the block representation. Once the information in the visualized elements is presented, the presentation process 900 continues back to the 'for each visualized element' iterative procedure 903 to iterate the next element. When all the elements have been iterated, the presentation process 900 continues to a 'for each connected parent-child node' iterative procedure 909 that iterates each parent node and child node combination to provide a spline connector between the parent and child nodes.

As each parent/child node combination is iterated, an 'optional avoidance' procedure 911 can be called to specify spline points and/or adjust spline point tension and bias parameters such that the resulting splined connectors between the parent and child nodes tend to avoid areas that include an extent of any block representation. If no special parameters are provided by the 'optional avoidance' procedure 911, the presentation process 900 can use a formulistic spline parameterization that can be heuristically determined.

One such spline parameterization first sets spline end points at the center of the opposing edges of the visualized parent node and the visualized child node. A first spline point can be added approximately ⅔ of the depth distance from the parent's spline end point and inline with that point. A second spline point can be added approximately ⅞ of the depth distance from parent's spline end point and ⅞ of the breadth distance from the parent's spline end point.

A 'present spline' procedure 913 then presents the iterated connector between the visualizations of the parent and child nodes. When all the visualized node connectors have been iterated, the presentation process 900 continues to a 'present elided depth levels' procedure 915 that visualizes the elided depth level trail and completes through an end terminal 917.

FIG. 10 illustrates an example visualization image 1000 that can be generated by application of the disclosed technology. In this example, an elided depth level trail area 1001 contains representations of the ancestor depth levels of a most recent focus-node 1003. The elided depth level trail area 1001 is visualized outside of a constrained display area 1004. To help the reader understand how depth levels are associated with the visualization, a depth level indicator 1005 is provided on the example visualization image 1000. However, such an indicator would not generally be needed for the visualization. A block visualization 1007 can be included within the constrained display area 1004. As has been discussed, an aggregate visualization 1011 indicates elided nodes. The existence of subtrees descending from secondary depth levels can be marked by a subtree indicator 1013. A pegged node visualization 1015 can be indicated by a color, or other highlighting mechanism.

One skilled in the art will understand that the layout process 400 can be invoked by: a call by a computer program, making the hierarchical data structure available to a program, task, process, thread, programmed-function, programmed-procedure, method, object, hardware device, or any combination thereof currently in existence or to be developed.

One skilled in the art will understand that one embodiment hierarchical data structure layout algorithm that supports the display of single or multi-focal trees within bounded space constraints. Together, these features allow interactive visualization at animation rates with hierarchical data structure structures on the order of million nodes while making the most of the available screen real estate.

One skilled in the art would understand that the block representations need not be visualized and that significant performance advantage accrue by the use of the block representation when performing the aggregation and layout functions for the visualized nodes for multi-focal presentation of the hierarchical data structure.

One skilled in the art will understand that the procedures discussed herein can be implemented in electronic or other circuitry or logic, as well as implemented by the use of a programmed computer or data processor. Such a one will also understand that the methods described herein and their equivalents can be implemented using procedural, object-oriented, or other programming methodologies.

One skilled in the art will understand that the technology disclosed herein is a very efficient layout algorithm for hierarchical data structures.

Both empirical and theoretical analyses confirm the efficiency of the layout process 400 that computes a space-constrained, multi-focal layout in nearly linear running time, bounded from above by n log n, where n is the number of visible nodes prior to aggregation. Both the first and third passes made by the algorithm are linear, as they involve a single walk through the hierarchical data structure and the node size computation and hierarchical data structure segmentation routines run in constant time. The point at which non-linear complexity is introduced is during the second pass, if and when aggregation occurs, requiring the n log n operation of sorting the nodes in a given depth level. However, this rarely includes the whole visualized structure, making the common case less costly than the upper bound might imply. In actual usage, rendering bottlenecks slow the systems performance long before the computational burden of the layout process 400 becomes an issue.

Although the technology has been described in terms of the presently preferred embodiments, one skilled in the art will understand that various modifications and alterations may be made without departing from the scope of the claims. Accordingly, the scope of the claims is not to be limited to the particular embodiments discussed herein.

What is claimed follows:

1. A computer controlled method executed on a suitably programmed computer comprising:

configuring a constrained display area comprising a constrained depth extent and a constrained breadth extent;

receiving a hierarchical data structure comprising a plurality of nodes containing information comprising text and a respective node interest characteristic;

distributing the nodes over depth levels;

segmenting the hierarchical data structure into a plurality of blocks, each block comprising sibling nodes selected from the nodes and associated with a breadth and one or more of the depth levels;

determining an extent for each depth level comprising a total of the breadth for each block associated with that depth level;

determining that the extent for at least one of the depth levels exceeds the constrained breadth extent;

decreasing the extent by ordering the sibiling nodes for each block in the at least one depth level by their respective node interest characteristic and by aggregating at least a part of the sibling nodes as aggregates for one or more of the blocks into an elided subset based on the respective node interest characteristic such that the extent does not exceed said constrained breadth extent;

assigning the unaggregated sibling nodes in each block into a visualized subset;

placing the blocks into the constrained display area for each depth level and positioning the unaggregated sibling nodes of the visualized subset and the aggregates within the blocks; and presenting the information associated with the unaggregated sibling nodes of the visualized subset within the constrained display area.

2. The computer controlled method of claim 1, wherein the visualized subset includes one or more focus-nodes.

3. The computer controlled method of claim 2, comprising:
constructing an initial layout of the hierarchical data structure;
computing an initial depth extent of the initial layout;
determining that the initial depth extent is larger than the constrained depth extent; and
positioning the one or more focus-nodes in the constrained display area.

4. The computer controlled method of claim 3, further comprising:
representing the depth levels that contain an ancestor node of the one or more focus-nodes by an elided depth level trail.

5. The computer controlled method of claim 4, further comprising:
positioning the elided depth level trail along a periphery outside of the constrained display area; and
presenting the elided depth level trail.

6. The computer controlled method of claim 1, further comprising:
associating each depth level with one or more block descriptors.

7. The computer controlled method of claim 1, further comprising:
detecting the sibling nodes in the elided subset;
assigning an aggregated node to the sibling nodes; and
adding the aggregated node to the visualized subset.

8. The computer controlled method of claim 1, wherein the node interest characteristic comprises at least one of a degree of interest value, a rank, a priority, and a classification.

9. The computer controlled method of claim 1, further comprising:
selecting a first depth level from the depth levels and associating the first depth level with a first focus-node; and
selecting a second depth level from the depth levels and associating the second depth level with a second focus-node.

10. The computer controlled method of claim 1, further comprising:
selecting a first depth level from the depth levels and associating the first depth level with a first focus-node; and
selecting a second depth level from the depth levels and associating the second depth level with a child node of the first focus-node.

11. The computer controlled method of claim 1, further comprising:
connecting a parent node to a child node in the visualized subset using a spline connector.

12. An apparatus having a central processing unit (CPU) and a memory coupled to said CPU comprising:
a display logic configured to present a constrained display area comprising a constrained depth extent and a constrained breadth extent;
an input logic configured to receive a hierarchical data structure comprising a plurality of nodes containing information comprising text and a respective node interest characteristic;
a distribution logic configured to distribute the nodes over depth levels;
a block construction logic configured to segment the hierarchical data structure into a plurality of blocks, each block comprising sibling nodes selected from the nodes and associated with a breadth and one or more of the depth levels;
a breadth exceeded logic configured to determine an extent for each depth level comprising a total of the breadth for each block associated with that depth level and further configured to determine that the extent for at least one of the depth levels exceeds the constrained breadth extent;
a node partitioning logic configured to decrease the extent by ordering the sibling nodes for each block in the at least one depth level by their respective node interest characteristic and by aggregating at least a part of the sibling nodes as aggregates for one or more of the blocks into an elided subset based on the respective node interest characteristic such that the extent does not exceed said constrained breadth extent;
an assignment logic configured to assign the unaggregated sibiling nodes in each block into a visualized subset;
a placement logic configured to place the blocks into the constrained display area for each depth level and to position the unaggregated sibling nodes of the visualized subset and the aggregates within the blocks; and
a presentation logic configured to present the information associated with the unaggregated sibling nodes of the visualized subset within the constrained display area.

13. The apparatus of claim 12, wherein the visualized subset includes one or more focus-nodes.

14. The apparatus of claim 13, further comprising:
an initial layout logic configured to construct an initial layout of the hierarchical data structure and further configured to determine an initial depth extent of the initial layout;
a comparison logic configured to detect that the initial depth extent is larger than the constrained depth extent; and
a panning logic configured to position the one or more focus-nodes in the constrained display area.

15. The apparatus of claim 14, further comprising:
an elision logic configured to represent the depth levels that contain an ancestor node of the one or more focus-nodes by an elided depth level trail.

16. The apparatus of claim 15, further comprising: a display logic configured to position and present the elided depth level trail along a periphery outside of the constrained display area.

17. The apparatus of claim 12, further comprising:
a display logic configured to position and present block descriptors within the constrained display area and further configured to associate each depth level with one or more of the block descriptors.

18. The apparatus of claim 12, further comprising:
a node aggregation logic configured to detect a plurality of sibling nodes in the elided subset and further configured to assign an aggregated node to the plurality of sibling nodes; and
an aggregate insertion logic configured to add the aggregated node to the visualized subset.

19. The apparatus of claim 12, wherein the node interest characteristic comprises at least one of a degree of interest value, a rank, a priority, and a classification.

20. The apparatus of claim 12, further comprising:
a selection logic configured to select a first depth level from the depth levels and further configured to associate the first depth level with a first focus-node; and
a second selection logic configured to select a second depth level from the depth levels and further configured to associate the second depth level with a second focus-node.

21. The apparatus of claim 12, further comprising:
a selection logic configured to select a first depth level from the depth levels and further configured to associate the first depth level with a first focus-node; and
a second selection logic configured to select a second depth level from the depth levels and further configured to associate the second depth level with a child node of the first focus-node.

22. The apparatus of claim 12, further comprising:
a connection logic configured to connect a parent node to a child node in the visualized subset using a spline connector.

23. A computer-readable storage medium storing computer executable program code to be executed by a computer system, the computer executable program code comprising a method of:
configuring a constrained display area comprising a constrained depth extent and a constrained breadth extent;
receiving a hierarchical data structure comprising a plurality of nodes containing information comprising text and a respective node interest characteristic;
distributing the nodes over depth levels;
segmenting the hierarchical data structure into a plurality of blocks, each block comprising sibling nodes selected from the nodes and associated with a breadth and one or more of the depth levels;
determining an extent for each depth level comprising a total of the breadth for each block associated with that depth level;
determining that the extent for at least one of the depth levels exceeds the constrained breadth extent;
decreasing the extent by ordering the sibling nodes for each block in the at least one depth level by their respective node interest characteristic and by aggregating at least a part of the sibling nodes as aggregates for one or more of the blocks into an elided subset based on the respective node interest characteristic such that the extent does not exceed said constrained breadth extent;
assigning the unaggregated sibling nodes in each block into a visualized subset;
placing the blocks into the constrained display area for each depth level and positioning the unaggregated sibling nodes of the visualized subset and the aggregates within the blocks; and
presenting the information associated with the unaggregated sibling nodes of the visualized subset within the constrained display area.

24. The computer-readable storage medium of claim 23, wherein the visualized subset includes one or more focus-nodes.

25. The computer-readable storage medium of claim 24, further comprising:
constructing an initial layout of the hierarchical data structure;
computing an initial depth extent of the initial layout;
determining that the initial depth extent is larger than the constrained depth extent; and
positioning the one or more focus-nodes in the constrained display area.

26. The computer-readable storage medium of claim 25, further comprising:
representing the depth levels that contain an ancestor node of the one or more focus-nodes into an elided depth level trail.

27. The computer-readable storage medium of claim 26, further comprising:
positioning the elided depth level trail along a periphery outside of the constrained display area; and
presenting the elided depth level trail.

28. The computer-readable storage medium of claim 23, further comprising:
associating each depth level with one or more block descriptors.

29. The computer-readable storage medium of claim 23, further comprising:
detecting the sibling nodes in the elided subset;
assigning an aggregated node to the sibling nodes; and
adding the aggregated node to the visualized subset.

30. The computer-readable storage medium of claim 23, wherein the node interest characteristic comprises at least one of a degree of interest value, a rank, a priority, and a classification.

31. The computer-readable storage medium of claim 23, further comprising:
selecting a first depth level from the depth levels and associating the first depth level with a first focus-node; and
selecting a second depth level from the depth levels and associating the second depth level with a second focus-node.

32. The computer-readable storage medium of claim 23, further comprising:
selecting a first depth level from the depth levels and associating the first depth level with a first focus-node; and
selecting a second depth level from the depth levels and associating the second depth level with a child node of the first focus-node.

33. The computer-readable storage medium of claim 23, further comprising:
connecting a parent node to a child node in the visualized subset using a spline connector.

* * * * *